United States Patent [19]
Kazami

[11] Patent Number: 6,065,015
[45] Date of Patent: May 16, 2000

[54] METHOD AND APPARATUS FOR EDITING AN IMAGE FILE IN AN ELECTRONIC CAMERA

[75] Inventor: Kazuyuki Kazami, Tokyo, Japan

[73] Assignee: Nikon Corporation, Tokyo, Japan

[21] Appl. No.: 08/954,063

[22] Filed: Oct. 20, 1997

Related U.S. Application Data

[60] Provisional application No. 60/040,917, Mar. 27, 1997.

[30] Foreign Application Priority Data

Oct. 23, 1996 [JP] Japan ..................................... 8-280916

[51] Int. Cl.$^7$ .................................................. G06F 13/00
[52] U.S. Cl. .............................. 707/104; 707/102; 345/7; 345/118; 345/419; 352/45; 352/67; 352/137; 711/4
[58] Field of Search .................................... 707/102, 104; 345/118, 7, 419; 711/4; 352/45, 67, 137

[56] References Cited

U.S. PATENT DOCUMENTS

| | | | |
|---|---|---|---|
| 4,802,007 | 1/1989 | Van Der Brug | 348/179 |
| 4,964,066 | 10/1990 | Yamane et al. | 345/441 |
| 5,012,334 | 4/1991 | Etra | 348/107 |
| 5,262,867 | 11/1993 | Kojima | 348/39 |
| 5,491,591 | 2/1996 | Lemelson | 386/82 |
| 5,623,681 | 4/1997 | Rivette et al. | 707/522 |

*Primary Examiner*—Thomas G. Black
*Assistant Examiner*—Jean R. Homere
*Attorney, Agent, or Firm*—Oliff & Berridge, PLC

[57] ABSTRACT

An image file editing apparatus avoids duplicated display of image files when image files are being displayed from multiple recording medium that are removably insertable into the apparatus. A medium drive device writes and reads files stored in the removable recording medium. A list display device obtains or creates identification information of the image file in the recording medium and displays the image file in a list using identification information. A file selection device selects an image file displayed in the list corresponding to an external operation. An editing device executes an editing operation to one or a plurality of selected image files. The image file editing apparatus can also include a medium collating device that searches for identification information from a currently-installed recording medium, and that determines whether the recording medium has already been displayed in the list. The list display device displays the image files in a newly-installed recording medium in the list, when the list display device has determined by a collation result of the medium collating device that the recording medium is a newly-installed recording medium.

22 Claims, 10 Drawing Sheets

METHOD AND APPARATUS FOR EDITING AN IMAGE FILE IN AN ELECTRONIC CAMERA

RELATED PROVISIONAL APPLICATION

This nonprovisional application claims the benefit of Provisional Application No. 60/40,917, filed Mar. 27, 1997.

INCORPORATION BY REFERENCE

The disclosure of the following priority application is herein incorporated by reference: Japanese Patent Application No. 8-280916, filed Oct. 23, 1996.

BACKGROUND OF THE INVENTION

1. Field of Invention

This invention relates to an image file editing apparatus that edits an image file which might also include sound data stored in a recording medium. In particular, the invention relates to an image file editing apparatus that edits an image file stored in a removable recording medium.

2. Description of Related Art

Conventionally, an image file editing apparatus executes an editing operation such as a connecting process or a composing process for an image file comprising moving images, still images, or the like.

By performing this editing operation, for example, it is possible to take an image file that has been divided into a plurality of scenes during imaging and build a single picture image product formed by a plurality of images that have been suitably linked.

Further, in recent years, due to the development of digital signal processing, the above-described image file editing apparatus have been developed with programs for realizing their use in a computer.

Figure 10:
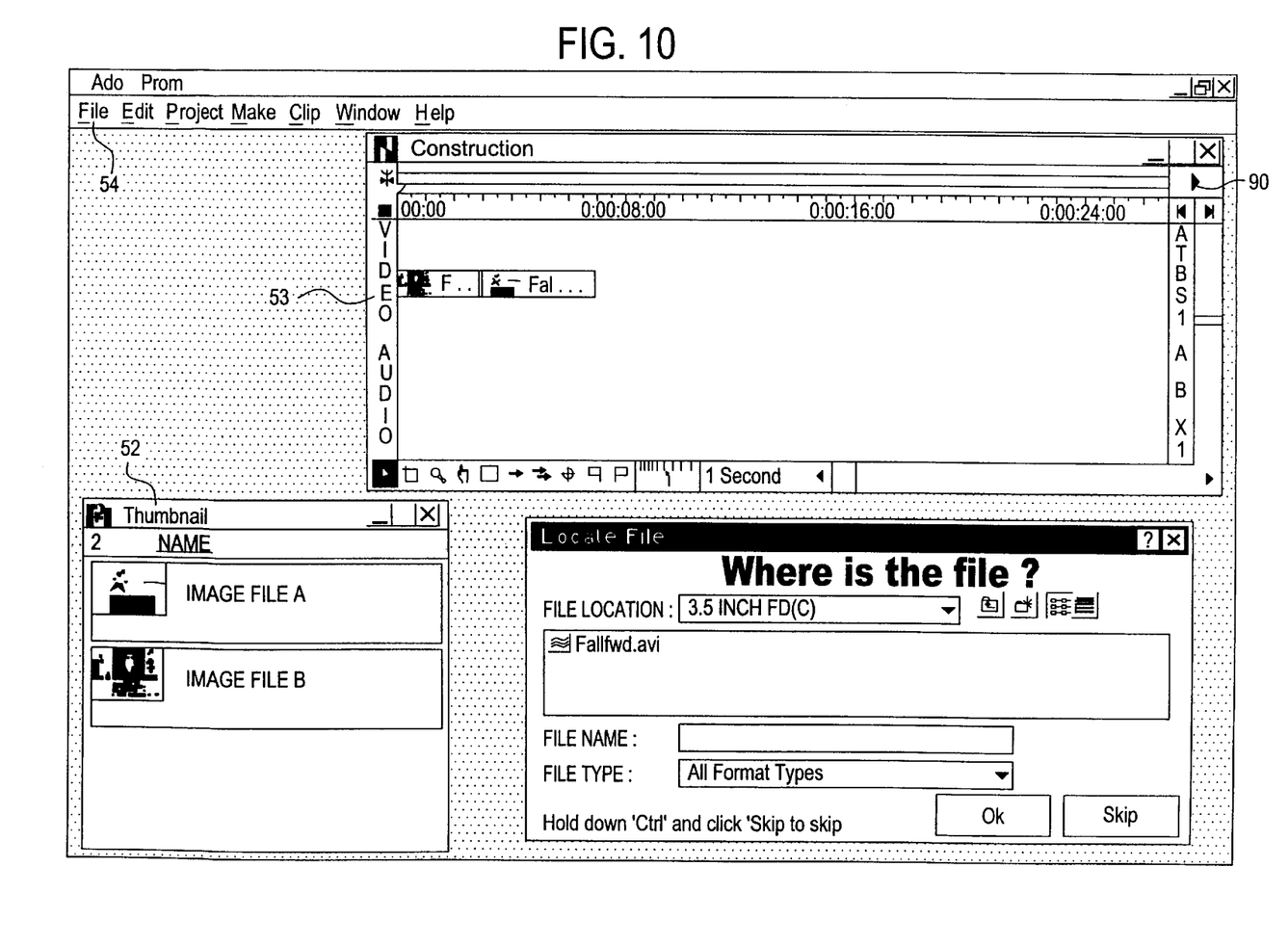
FIG. 10 is a schematic view of a computer display screen according to a conventional image editing apparatus.

FIG. 10 shows the computer display screen in this type of program. In FIG. 10, at the bottom left of a display screen 51, a thumbnail display component 52 is shown for displaying thumbnail images in a list. At the top side of the display screen 51, an editing region 53 is displayed for appropriately arranging the thumbnail images by a drag-and-drop operation. Further, at the very top of the display screen 51, a file menu 54 and the like are displayed linearly for performing file operations.

A dialogue operation between the operator and the display screen 51 is described below. First, the operator operates the file menu 54 and selects the image file on the recording medium. The computer partially reads out a lead image from the selected image file (for example, a first image if the file contains plural images), reduces the pixel density of this lead image and creates a thumbnail image. In this manner, the created thumbnail image is displayed in a list in the thumbnail display component 52.

In FIG. 10, the thumbnail images of an image file A and an image file B are displayed in the list. In this state, the operator drags-and-drops the thumbnail image of the thumbnail display component 52 into the editing region 53. When this is completed, the computer arranges the thumbnail images in a row corresponding to the drop position of each thumbnail image.

Then, when a playback button 90 (indicated by a triangle at the top right of the editing region 53) has been clicked, the computer sequentially reads out the image files corresponding to the order of the thumbnail images arranged in the editing region 53. The computer sequentially plays back the image files read out in this way on a sibling window (not shown) temporarily created on the display screen 51.

Further, when, for example, a "compile movie" function has been selected from the file menu 54, the computer sequentially links the corresponding image files in the order of the thumbnail images arranged in the editing region 53 and creates a single image file.

Generally, because image files are large, there are many instances in which a series of image files cannot be stored into one recording medium and have to be divided and recorded onto a plurality of recording media. For example, when an event that extends over a long period of time, such as a wedding ceremony, is being photographed by a digital video camera or the like, it cannot be photographed completely using just one recording medium. Image files are created, divided and stored onto a plurality of recording media.

When an image file is edited that has been recorded and divided onto a plurality of recording media in this way, the operator, while accurately grasping the content of each of the image files, must suitably switch the recording media (into and out of the image editing apparatus) during the process of image editing.

Because this is a difficult and intricate operation, when the recording media have been switched several times, it often occurs that there is an error in which a thumbnail image corresponding to one of the image files is displayed as being registered twice. This kind of thumbnail duplicated display, complicates the display screen and causes needless confusion when selecting the thumbnail image for the desired image file.

SUMMARY OF THE INVENTION

Therefore, to solve the problems mentioned above, an object of the present invention is to provide an image file editing apparatus that can precisely and reliably avoid duplication in the display list.

Another object of the present invention is to provide an image file editing apparatus that can reliably perform collating of the recording media with regard to read-only recording media.

Yet another object of the present invention is to provide an image file editing apparatus that can correctly perform collating of the recording media.

An image file editing apparatus according to an embodiment of the invention comprises a recording medium drive device that performs writing and reading of image files from a recording medium that is removably installed in the recording medium drive device. The apparatus also includes a list display device that uses the recording medium drive device to obtain identification information regarding image files stored on the removably installed recording medium and displays in a list image file representations of the image files on a display. A recording medium collating device searches out the identification information from the removably installed recording medium using the recording medium drive device and determines whether the removably installed recording medium includes image files for which image file representations are already displayed in the list. The list display device displays image file representations of image files stored on the removably installed recording medium in the list after it is determined that the removably installed recording medium includes image files that are different from the image files represented by the image file representations already displayed in the list.

The apparatus also preferably includes a file selection device and an editing device. The file selection device selects the image files displayed in the list formed by the list display device according to an externally provided operation. The editing device executes a predetermined editing operation on one or a plurality of image files selected via the file selection device.

According to an embodiment of the image file editing apparatus of the present invention, the recording medium collating device can include an identification readout device that reads out one or more types of previously stored information from the removably installed recording medium and uses the one or more types of information as the identification information. A new/old collating device determines that the removably installed recording medium includes image files that are different from image files corresponding to the image file representations already displayed in the list when the identification information fails to match previously read out identification information.

According to another aspect of the invention, the image file editing apparatus can include an identification recording device that stores identification information of recording media for which image file representations are displayed in the list by the list display device. A search determining device determines that the removably installed recording medium includes image files that are different from the image files corresponding to the image file representations already displayed in the list when the search determining device fails to find the identification information from the removably installed recording medium in the identification recording device.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Embodiments of the present invention are described below with reference to the drawings.

Figure 4:
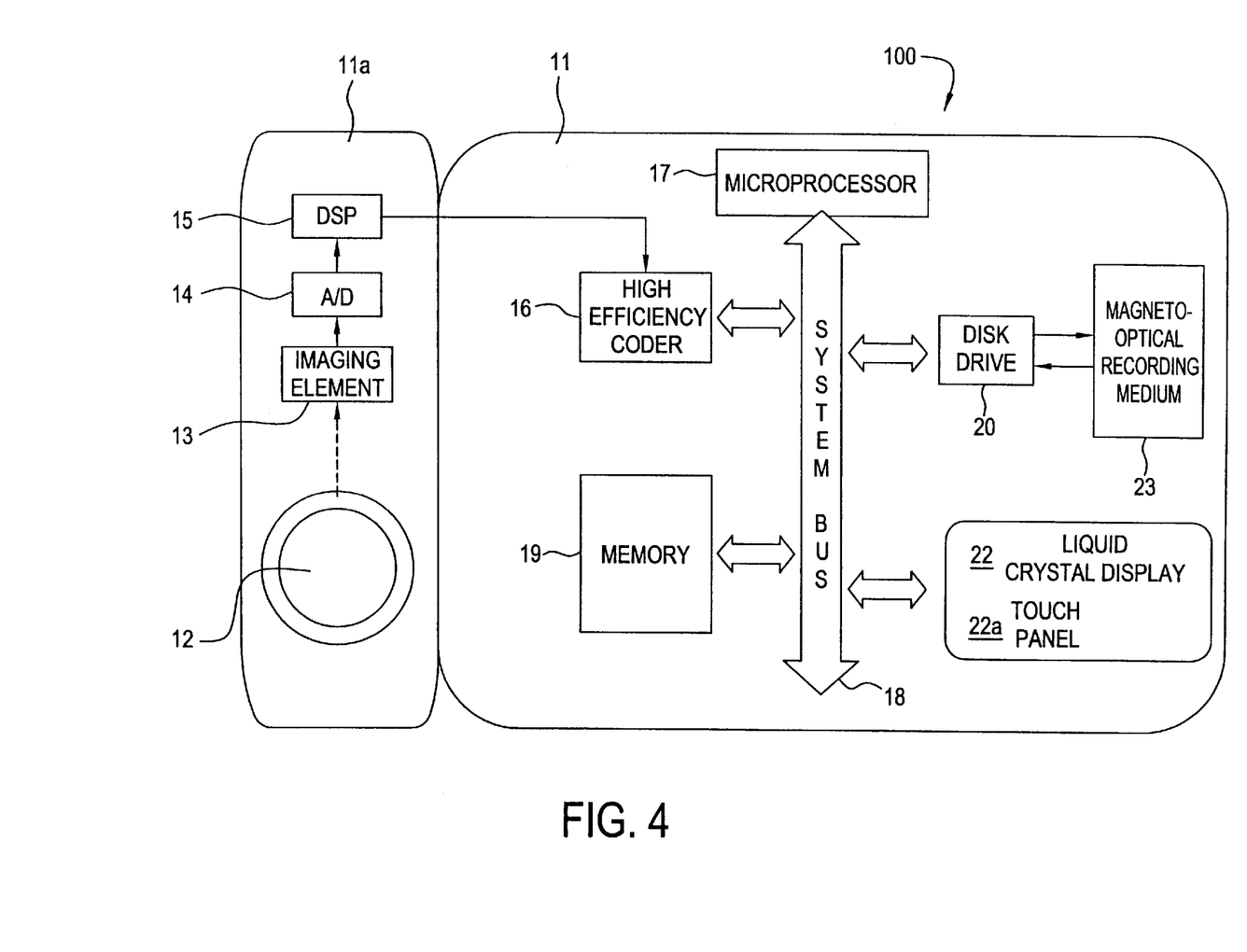
FIG. 4 is a block diagram of an electronic camera incorporating aspects of the present invention.
Figure 5:
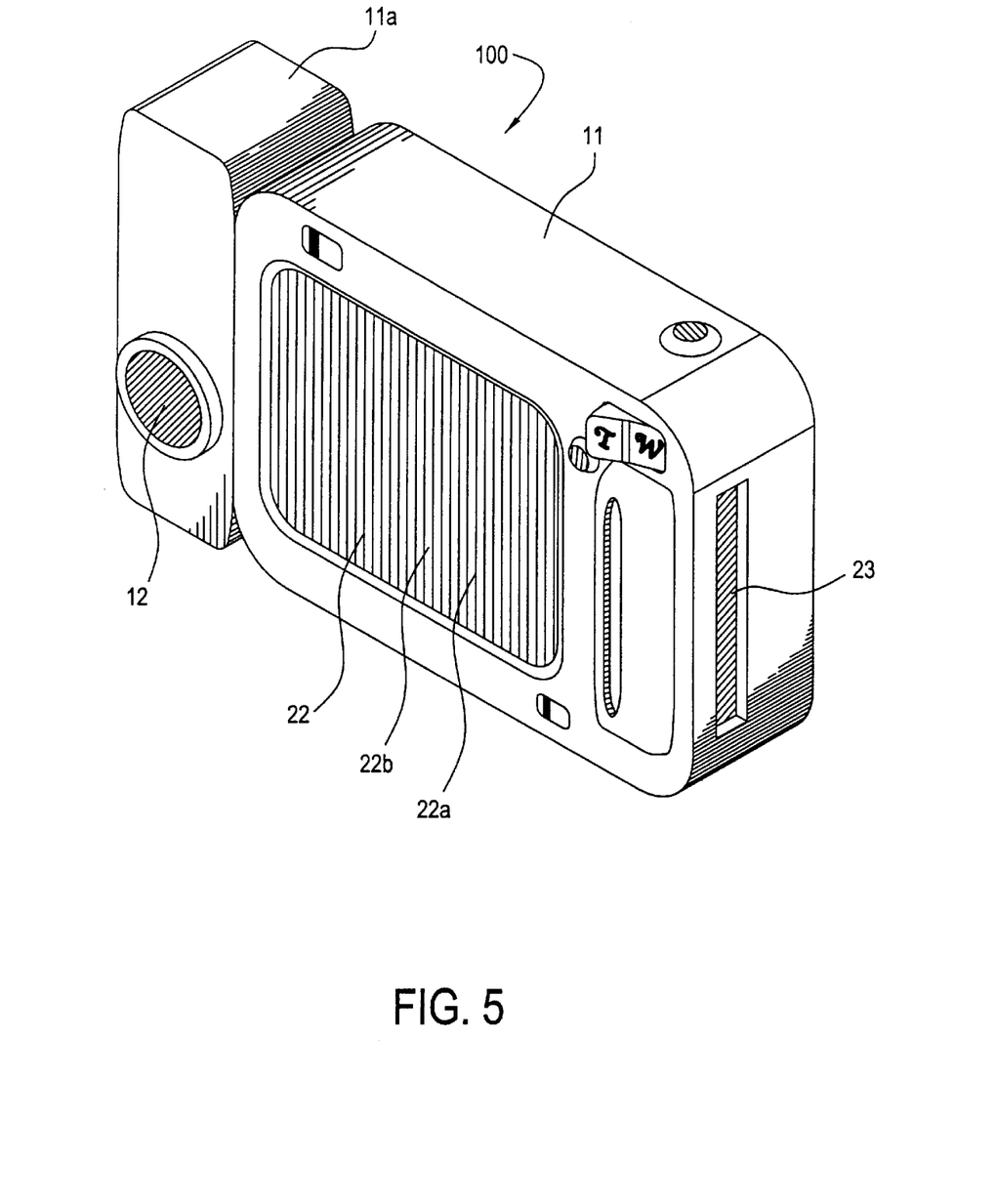
FIG. 5 is a perspective view of the FIG. 4 camera.

FIG. 4 is a functional block diagram of a first embodiment of an image file editing apparatus 100 of the present invention. FIG. 5 shows an outer appearance of the first embodiment of the image file editing apparatus 100 of the present invention.

In FIGS. 4 and 5, the camera part 11a, which is an attachment, is installed so that it freely rotates on a side surface of a main body 11 of the image file editing apparatus 100. A photographic lens 12, that forms an object image, is provided in the camera part 11a. An image propagated along the optical axis of the photographic lens 12 is refracted within the camera part 11a. A receptor surface of an imaging element 13, in the form of a CCD image sensor, is arranged along the optical axis and receives the image from lens 12.

An output of the imaging element 13 is connected to a digital signal processor (DSP) 15, that performs white balance adjustment, gamma correction and the like, after the signal is converted via an A/D converter 14.

An image output of digital signal processor 15 is connected to a system bus 18 of a microprocessor 17 via a high efficiency encoder 16. The high efficiency encoder is, for example, a device that compresses and decompresses images for storing on the recording medium and display on the display, respectively. Still and moving images can be compressed, respectively, according to the JPEG and MPEG standards, for example. A memory 19, a disk drive part 20, a liquid crystal display part 22, and a touch panel 22a are connected respectively to the system bus 18.

The touch panel 22a is adhered to a display screen 22b of the liquid crystal display part 22 and senses a contact position of a finger, pen or the like.

The disk drive part 20 is operably connected to an externally-inserted magnetooptical recording medium 23 and includes a head for reading and writing information and a drive function for driving the head.

The liquid crystal display part 22 includes a video memory rewriteable via the system bus 18, a liquid crystal drive circuit that reads out data from the video memory as desired and displays it on the screen, and the liquid crystal display screen 22b.

Figure 6:
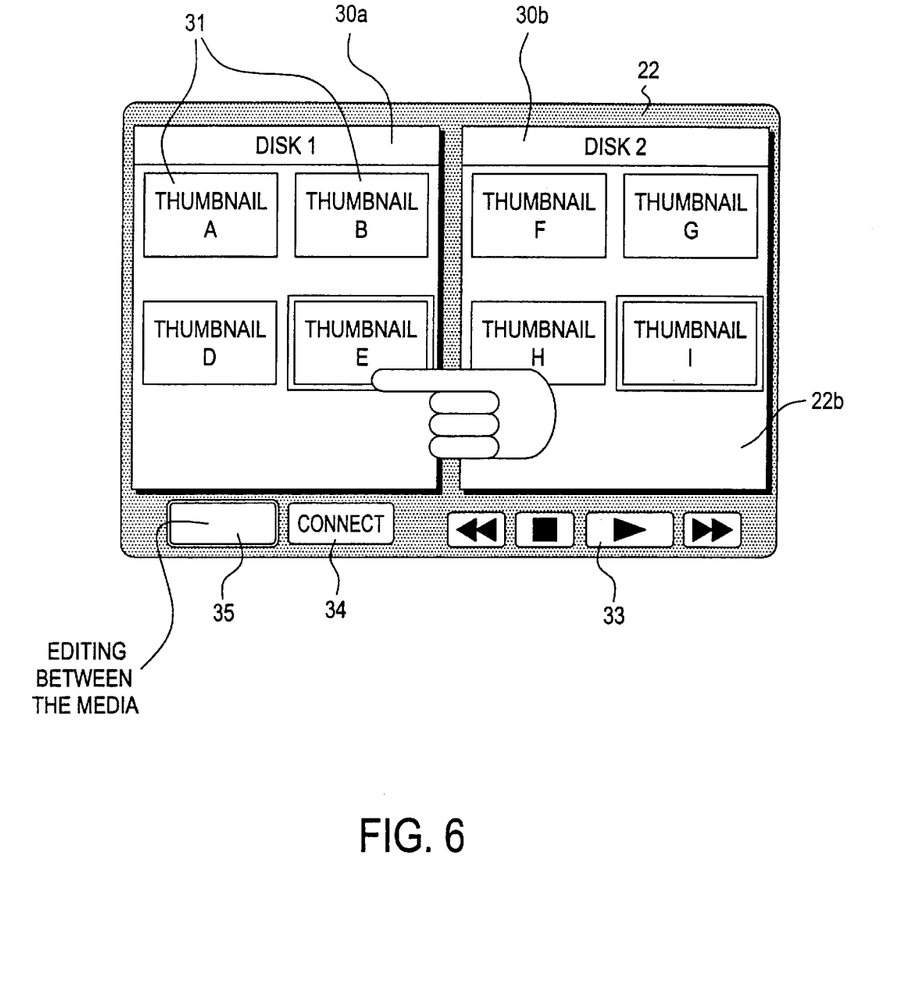
FIG. 6 is a schematic view illustrating a display example of a liquid crystal display part of the present invention.

FIG. 6 shows a display example of the liquid crystal display part 22. In FIG. 6, two sibling windows, i.e., a first region 30a and a second region 30b, are displayed on the display screen 22b of the liquid crystal display part 22. Thumbnail images 31 are respectively displayed on a list within the first region 30a and the second region 30b.

Further, a playback operation button 33 for operating playback of the image file, a connect button 34 for performing linking of the image files and an editing-between-the-media button 35 for switching modes of the editing-between-the-media mode are displayed as one example on the lower side of the display screen 22b of the liquid crystal display part 22.

Figure 1:
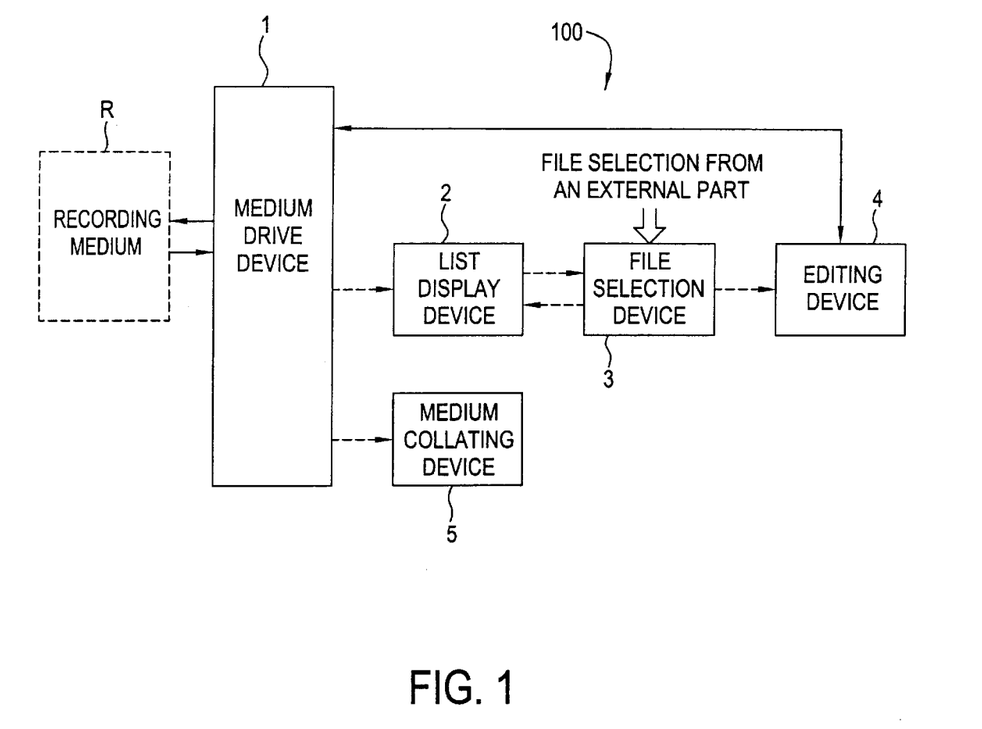
FIG. 1 is a block diagram representing a first aspect of an image file editing apparatus of the present invention.

The FIG. 4 embodiment relates to FIGS. 1–3, which are high-level representations of first through third aspects of the invention as follows. A recording medium drive device 1 includes the disk drive part 20. A list display device 2 includes the liquid crystal display part 22 and a function of the microprocessor 17 which displays an image file in the list in a thumbnail image format. A file selection device 3 includes the touch panel 22a and a function of the microprocessor 17 that selects the image file displayed in the list in correspondence with a contact position on the screen. An editing device 4 includes an image processing function of the microprocessor 17 that connects into the image files and a recording medium collating device 5 includes a function of the microprocessor 17 that collates the combined information, such as the file name, file capacity, and file number of the recording medium, and the identification information corresponding to the thumbnail image 31.

Figure 2:
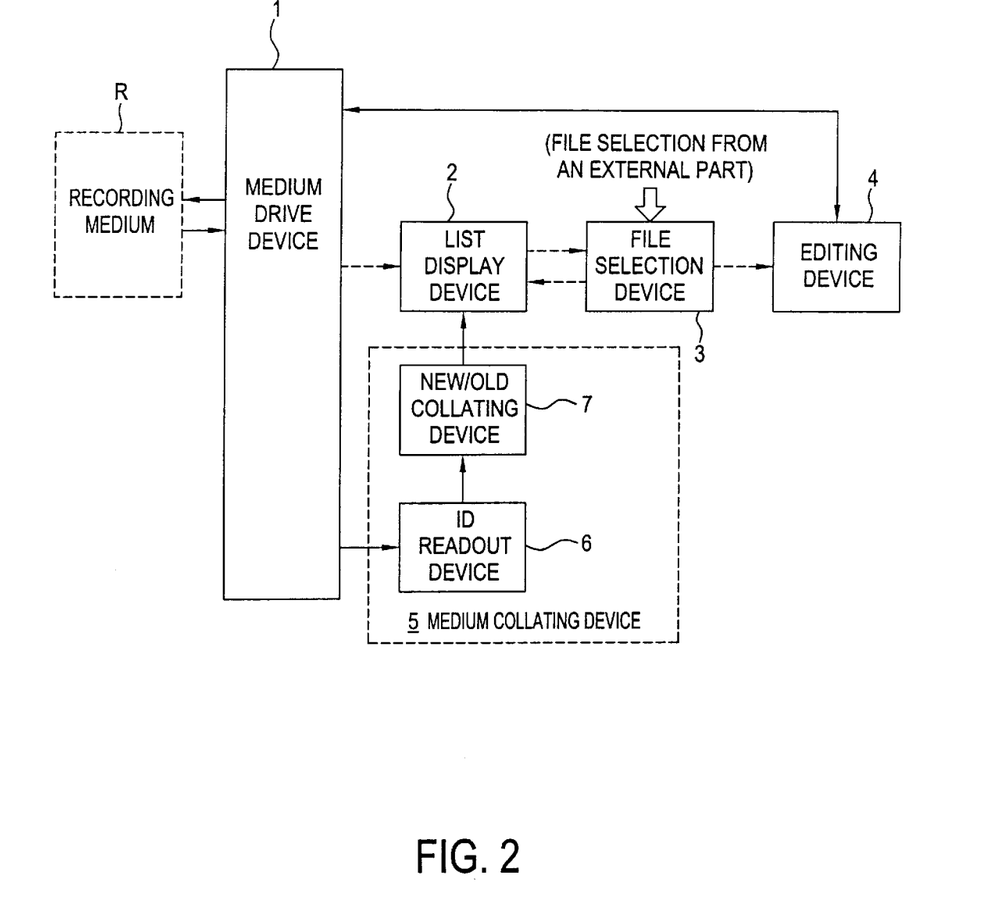
FIG. 2 is a block diagram representing a second aspect of the image file editing apparatus of the present invention.
Figure 3:
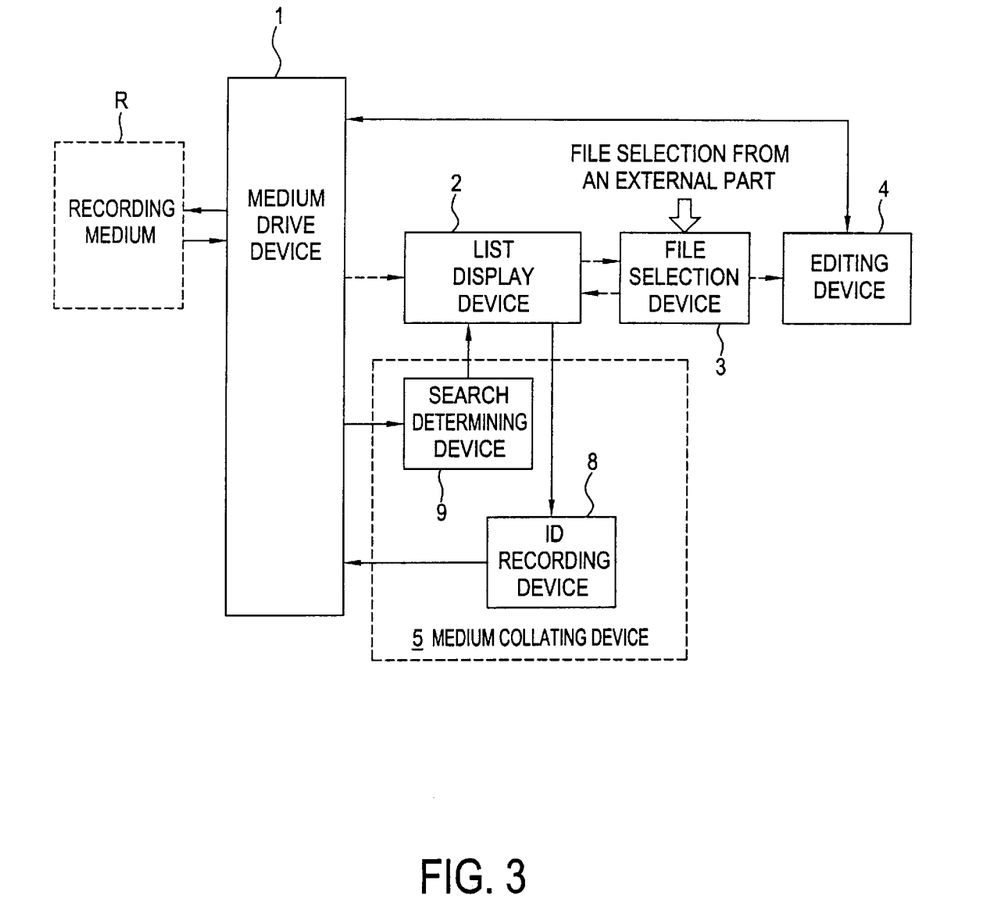
FIG. 3 is a block diagram representing a third aspect of the image file editing apparatus of the present invention.

With reference to FIG. 2, the identification readout device 6 includes a function of the microprocessor 17 for reading out the combined information, such as the file name, file capacity, and file number of the recording medium and using it as identification information. New/old collating device 7 includes a function of the microprocessor 17 for comparing and collating new and old identification information.

Figure 7:
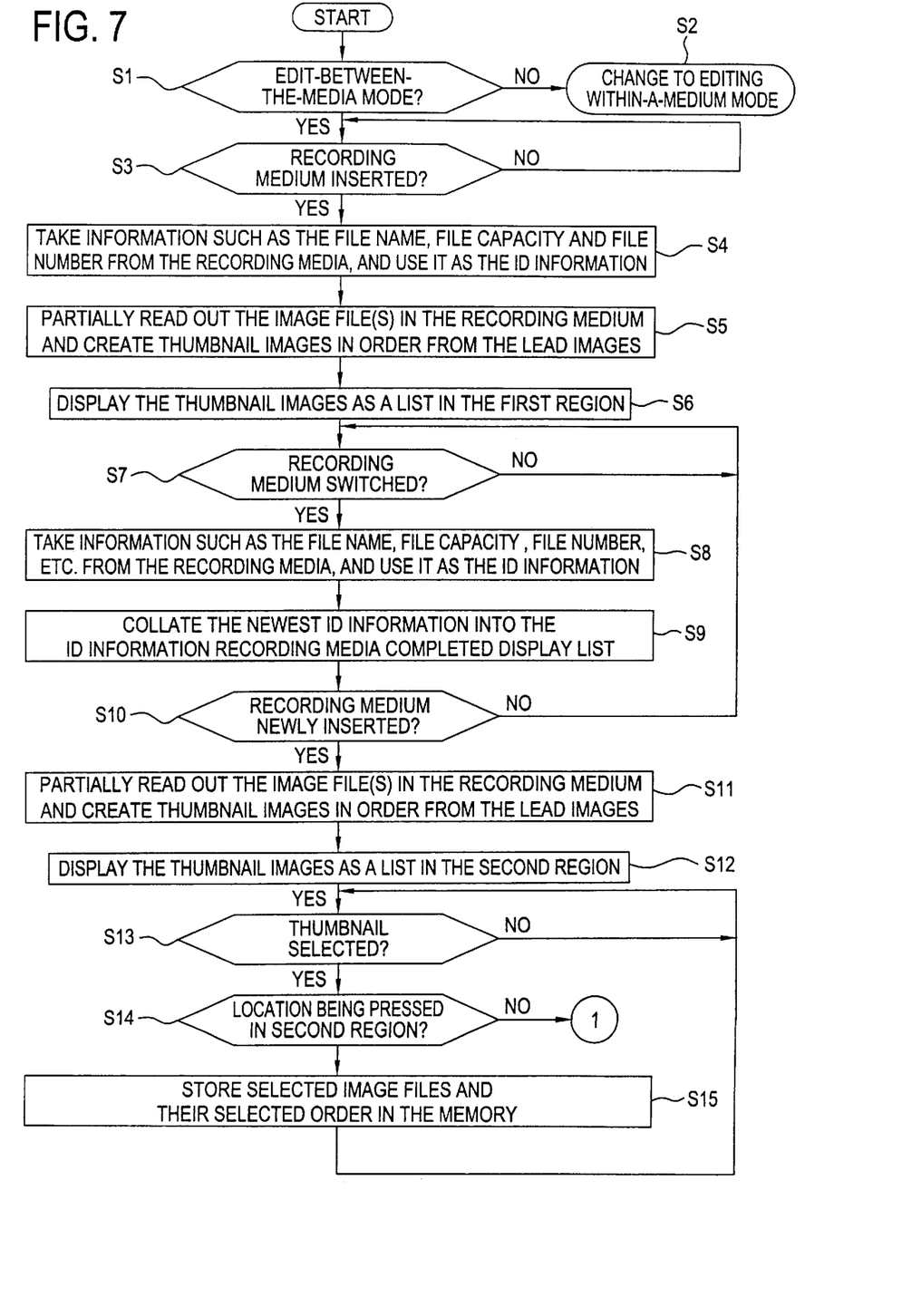
FIG. 7 is a flow chart explaining the operation of the image file editing apparatus of the present invention.
Figure 8:
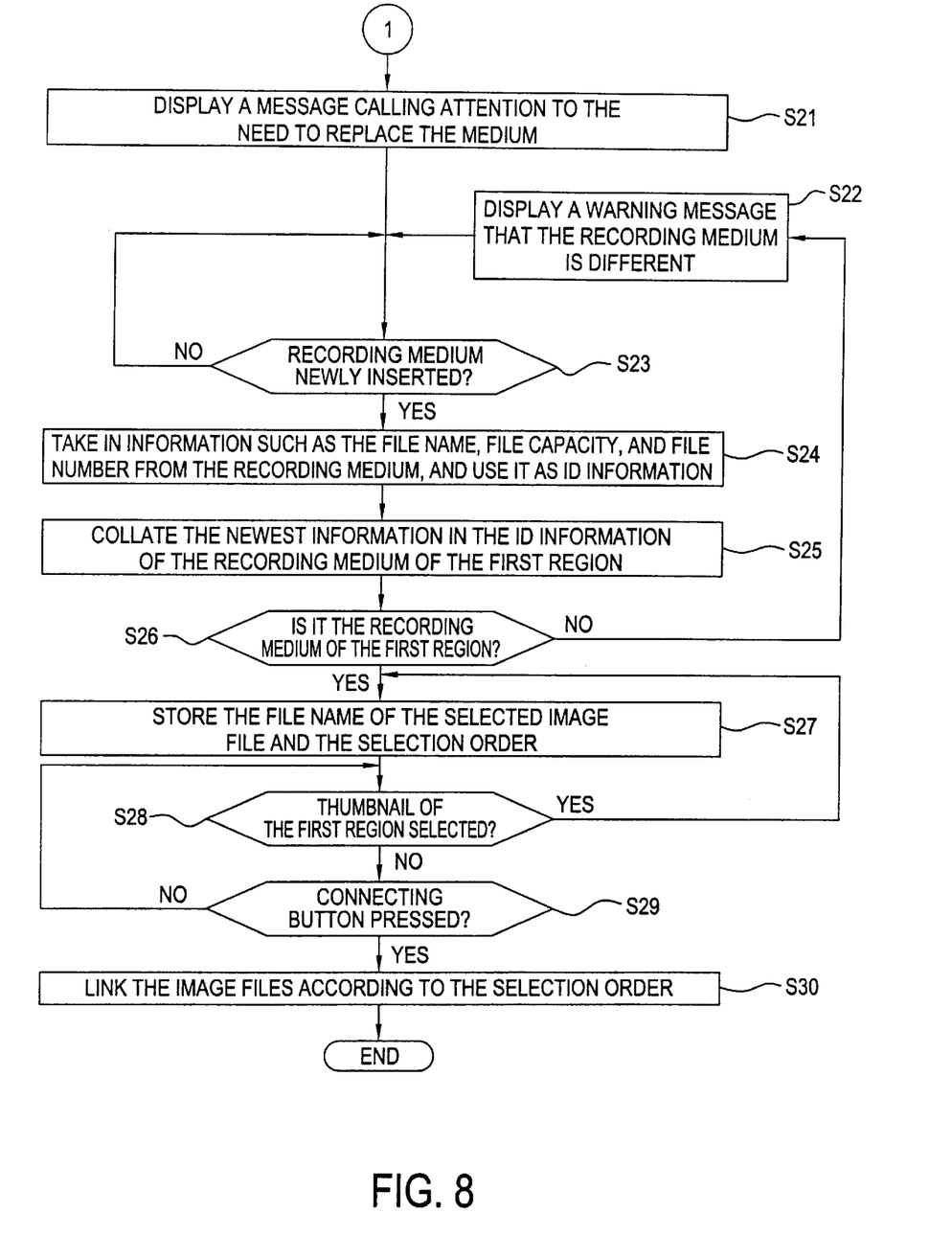
FIG. 8 is a continuation of the flow chart shown in FIG. 7.

FIGS. 7 and 8 are flow charts describing the operation of the present invention which is described below with reference to these drawings.

First, when power is supplied to the main body 11, the display screen 22b is displayed on the liquid crystal display part 22 as shown in FIG. 6. Thumbnail images 31 are not displayed in this initial state of the display screen 22b. Usually, in this state, when an operation button (not shown) displayed on the display screen 22b is pressed by a finger or by a pen, the microprocessor 17 senses the pressure position via the touch panel 22a. A message corresponding to this pressure position occurs at any time during operation of the microprocessor 17.

Initially, the microprocessor 17 determines whether it is in the editing-between-the media mode (step S1). As the default mode, it is set in a well-known operation mode commonly referred to as "editing-within-the-media mode" that performs image editing which is limited to image files on a single magnetooptical recording media 23 installed in the disk drive 20. As a result, the microprocessor 17 usually moves to operating in the editing-within-the-media mode (step S2).

On the other hand, when a message occurs such as "editing-between-the-media button 35 has been pushed," the microprocessor 17 moves to the editing-between-the-media mode that performs editing of one magnetooptical recording medium 23 or a plurality of magnetooptical recording media 23 and executes the following operation.

First, the microprocessor 17 commands the appropriate readout from the disk drive part 20 and waits until a significant amount of readout information has been obtained after it is determined that a magnetooptical recording medium 23 has been inserted (step S3).

Next, the microprocessor 17 reads out via the disk drive part 20 combined information, such as the file name, the file capacity, and the file number, of the files stored on the magnetooptical recording medium 23, and uses it as identification information (step S4). The microprocessor 17 records the identification information in the memory 19.

The microprocessor 17 partially reads out via the disk drive part 20 the image files on the magnetooptical recording medium 23, and obtains a lead image of the image file and executes pixel density conversion of the lead image to create a thumbnail image 31 (step S5).

The microprocessor 17 forwards, in order, the thumbnail images 31, created in this way to a video memory of the liquid crystal display part 22 and displays them in a list in the first region 30a (step S6).

Next, in step S7, the microprocessor determines whether the magnetooptical recording medium has been switched. This can be done any number of ways. For example, the microprocessor 17 can wait until the reading out of information from the originally-inserted magnetooptical recording medium 23 is interrupted, i.e. the originally-inserted magnetooptical recording medium has been ejected, and until the readout of information has again been started, i.e., a magnetooptical recording medium has been inserted. By this confirmation, the microprocessor 17 can confirm switching of the magnetooptical recording media 23. However, at this point, the microprocessor does not know whether the newly inserted magnetooptical recording medium is a new medium or a previously installed medium.

Next, the microprocessor 17, with regard to the switched magnetooptical recording medium 23, reads out the combined information, such as the file name, file capacity and file number, via the disk drive part 20, uses it as identification information, and records it in the memory 19 (step S8). The microprocessor 17 collates (compares) this newest identification information with the identification information previously obtained in the memory 19 (step S9).

The result of this collating is that, when matching items of combined information exceed a predetermined number, the microprocessor 17 determines that a different magnetooptical recording medium 23 has not been installed (i.e., a previously inserted magnetooptical recording medium has been reinserted), returns to step S7, and repeats that operation. On the other hand, when the matching items do not satisfy the predetermined number, the microprocessor 17 determines that a new magnetooptical recording medium 23 has been installed (step S10). The predetermined number can have a value of one, or more than one.

The comparison can be on a file-by file basis, in which, using the identification information, it is determined whether the image files stored on the installed disk match image files that were previously read. Since image files stored on different recording media may have some similar attributes (e.g., some similar file names), it is possible for there to be some matches between some of the identification information on the different recording media even though the image files are different. Accordingly, it is advisable to compare a plurality of image files on the recording medium with those previously read to determine whether the recording medium was previously inserted. Alternatively, the comparison can be on a medium-by-medium basis, in which it is determined whether the identification information of the installed recording medium matches the identification information of a previously installed recording medium.

After step S10, the microprocessor 17 partially reads out the image file from the newly-installed magnetooptical recording medium 23, and obtains the lead image of the image file. The microprocessor 17 executes pixel density conversion of this lead image, and creates a thumbnail image 31 (step S11). The microprocessor 17 forwards, in order, the thumbnail image 31 created in this way to the video memory of the liquid crystal display part 22 and displays it in a list in the second region 30b (step S12).

When a new recording medium is installed, the thumbnail images 31 are respectively displayed on the lists of the two regions 30a and 30b. In this state, the microprocessor 17 waits for execution of the thumbnail selection by the operator (step S13).

At this point, when thumbnail selection occurs in the second region 30b (YES in step S14), the microprocessor 17 determines the selected image file based on the thumbnail selection pressure position (on the touch tablet). The microprocessor 17 records this image file, in conjunction with the selection order data, as is, in the memory 19 (step S15). The process returns to step S13 and the operation described above is repeated. During the repeating operation, when thumbnail selection has occurred in the first region 30a (NO in step S14), the microprocessor 17 determines that a thumbnail belonging to the previously-inserted medium has been selected, and displays a message, suggesting that the operator switch the magnetooptical recording medium 23 on the liquid crystal display part 22 (step S21 as shown in FIG. 8).

In this state, the microprocessor 17 waits until the switching of the magnetooptical recording medium 23 has been completed (step S23). When the switching of the magnetooptical recording medium 23 has been completed, the microprocessor 17 reads out information via the disk drive part 20, such as the file name, file capacity, and file number, and uses it as identification information (step S24).

The microprocessor 17 collates this identification information with the previous identification information in the memory 19 (step S25). As a result of collating, when the number of matching items do not satisfy the predetermined number, the microprocessor 17 determines that a magnetooptical recording medium different from the magnetooptical recording, medium 23 of the previous time has been inserted, and displays a warning message that the recording medium is different (step S22), and returns to step S23.

On the other hand, when the matching items exceed the predetermined number, the microprocessor 17 determines that the magnetooptical recording medium 23 of the previous time has been properly installed (step S26). In this state, the microprocessor 17 handles thumbnail selection within the first region 30a and records the file name and the selection order data of the selected file image in the memory 19 (step S27). The operation of step S27 repeats whenever a thumbnail image has been selected in the first region 30a (step S28).

During thumbnail selection, when a message such as "the connect button 34 has been pressed" occurs (step S29), the microprocessor 17, according to the selection order data, first sequentially connects the image files in the memory 19. Then, the microprocessor 17 continues to call out image files of the magnetooptical recording medium 23, in sequence from the memory 19, according to the selection order data and the file name. The microprocessor 17 records the image files linked in this way to the magnetooptical recording medium 23 via the disk drive part 20 (step S30).

By this operation, in this embodiment of the present invention, when a magnetooptical recording medium 23 has been newly installed, the image files in the recording medium are displayed automatically as a list. Therefore, when a recording medium is newly inserted, there is no need to deliberately display the image files as a list.

Further, no matter how many times the recording media have been switched, confusion will never occur. For example, the duplicate display of one of the image files in the list will not occur.

Furthermore, because the originally-existing information in the recording medium is used as identification information, there is no need to write superfluous identification information on the recording medium. Also, read-only recording media can be reliably collated.

Figure 9:
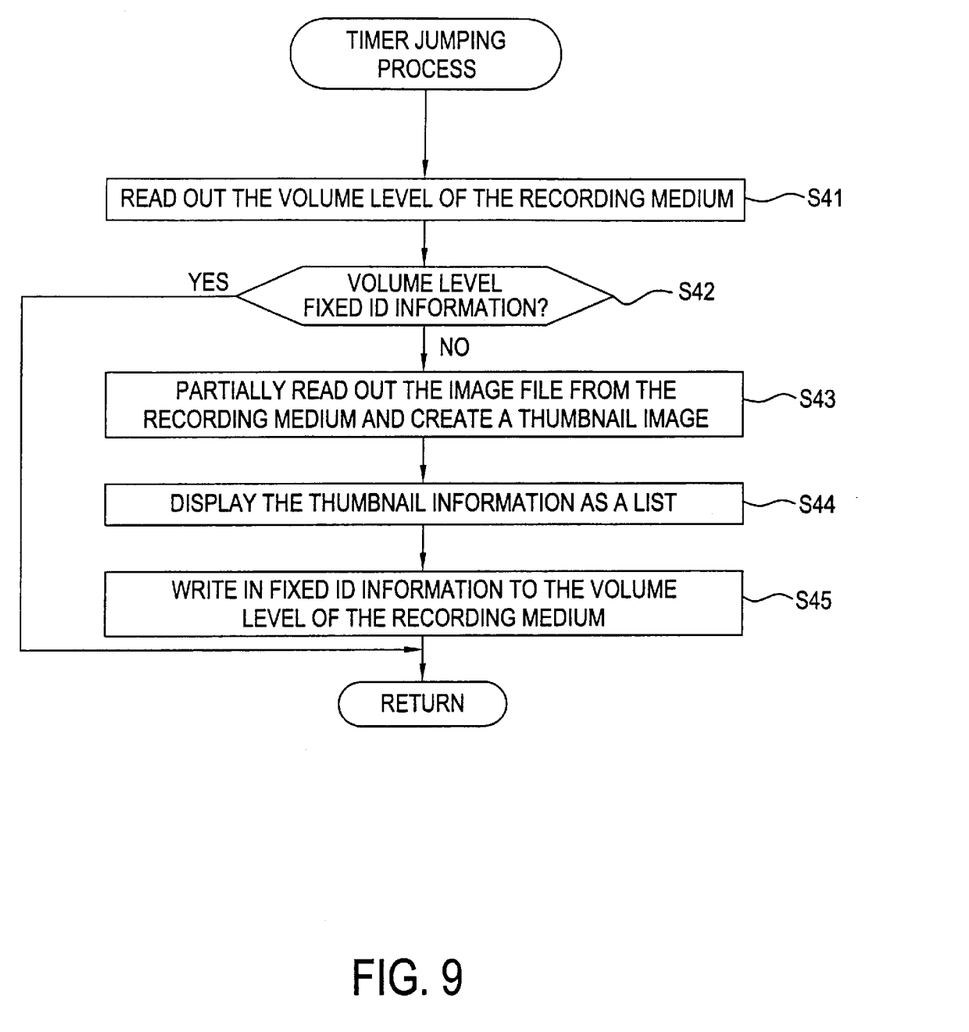
FIG. 9 is a flow chart describing the operation of another embodiment of the image file editing apparatus of the present invention.

Next, another embodiment of the present invention is described. FIG. 9 is a flow chart showing the operation of a second embodiment of the image file editing apparatus of the present invention.

With regard to the featured point in the structure in the second embodiment, only one part of the internal function of the microprocessor 17 is different, so repetitive explanation is omitted of the parts that are similar to the first embodiment shown in FIGS. 4 and 5.

This embodiment relates to FIG. 3 as follows. The recording medium drive device 1 includes the disk drive part 20. The list display device 2 includes the liquid crystal display part 22 and the function of the microprocessor 17 that displays the image file as a list in thumbnail image format. The file selection device 3 includes the touch panel 22a and the function of the microprocessor 17 for selecting the image file displayed in a list in correspondence with the contact position on the display screen. The editing device 4 includes the information processing function of the microprocessor 17 that connects the image files. The recording medium collating device 5 includes the function of the microprocessor 17 for collating the volume level of the recording medium. The identification recording device 8 includes the function of the microprocessor 17 that records fixed identification information at a volume level in the recording medium. The search determining device 9 includes the function of the microprocessor 17 comparing and collating the fixed identification information and the volume levels of the recording media. The identification information includes the thumbnail image 31.

FIG. 9 explains the operation of the second embodiment of the present invention as discussed below.

In the microprocessor 17, common processes such as thumbnail selection and editing processes are performed. Between these common processes, the microprocessor 17 causes a timer interrupt at fixed times, respectively, and executes the following interrupt process.

First, the microprocessor 17 reads out the volume level of the magnetooptical recording medium 23 via the disk drive part 20 (step S41). The volume level is a measure of the amount of data stored in the recording medium. The volume level includes a combination of the appropriate characters, numbers, symbols and the like stored in the recording medium and is used as identification information for that recording medium. The microprocessor 17 determines whether the volume level of the installed recording medium matches previously stored identification information (step S42). (The previously stored identification information is the volume levels of previously read recording media.) When it matches the previously stored identification information, the microprocessor 17 determines that it is a magnetooptical recording medium 23 having image files already identified in the list (their corresponding thumbnail images are displayed in the list) and completes the interrupt process.

On the other hand, when it does not match the previously stored identification information, the microprocessor 17 determines that the magnetooptical recording medium 23 has been newly installed. The microprocessor 17 partially reads out the image files from this magnetooptical recording medium 23, and creates the thumbnail images 31 from the lead images in the image files (step S43).

The microprocessor 17 forwards the thumbnail images 31 created in this way to the video memory of the liquid crystal display part 22, and displays them on the list. As a result, a new/old thumbnail display is combined on the display screen (step S44).

Next, the microprocessor 17 stores (e.g., in memory 19) the volume level of the installed magnetooptical recording medium 23 as identification information along with the previously stored identification information (step S45).

In this way, by writing in the identification information in this way, it is possible to reliably avoid duplication of the thumbnail display, when this magnetooptical recording medium 23 has been inserted again at another time. After this operation, the microprocessor 17 completes the interrupt operation.

In the embodiments of the present invention described above, the magnetooptical recording medium 23 has been used as the recording medium, but the material or form of the structure of the recording medium is not limited to magnetooptical recording media in this invention. Any recording medium may be used in which it is possible to record image files. For example, an optical recording medium, a magnetic recording medium, a memory card (e.g., a flash memory), or the like, may be used.

Further, in the embodiments of the present invention described above, for the editing operation, linking of the image files has been described. However, the present invention is not limited to linking of the image files. Any editing operation of the image file may be used. For example, as an editing operation, it is possible to copy an image file, to move an image file, to create image composites in the image files, and the like, between a plurality of recording media. Moreover, in the image file linking process, it is possible to include "feature" linking processes such as overlapping, fade-in, fade-out, wipe-in and wipe-out.

Furthermore, in the embodiments of the present invention described above, the thumbnail image 31 is used as the identification information. However, the present invention is not limited to the thumbnail image used as the identification information. It is possible to use any identification information that helps the operator distinguish between image files. For example, it is acceptable to use character information such as the file name and file creation date and/or time.

Although the disclosed embodiment used a touch panel that was actuated using a finger or light pen, the invention is not limited to apparatus using touch panels. For example, a cursor moved by a mouse and actuated by clicking, etc., can be used to select and move files.

Further, in the second embodiment of the present invention, the volume level of each recording medium is used as identification information and is stored in memory. However, this invention is not limited to using volume level information as the identification information. It is possible to access a predetermined location on the recording medium, such as a control region, a data region, and the like, anywhere on the recording medium and to use the information stored therein as identification information.

As described above, in the embodiments of the present invention when a recording medium has been newly installed, a representation (a thumbnail image) of the image file or image files in the recording medium are automatically displayed in a list. Therefore, whenever the recording media are switched and a new one inserted, it is not necessary to deliberately display the image file representation in the list. Further, however many times the recording media are switched, it is possible to accurately and reliably avoid the confusion that occurs when a representation of one image file in the recording media is displayed as a duplicate in the list.

Further, there is no need to write in excess identification information in the recording medium because the originally-existing information in the recording medium is used as the identification information.

Further, the recording media can be more reliably collated when the information existing in the recording media is suitably combined for use as identification information.

Further, it is possible to reliably perform collating even with regard to read-only recording media, because superfluous identification information is not written on the recording media.

As described above, in an image file editing apparatus of the present invention, entries in the image file display list are not duplicated, and can be automatically displayed. As a result, the operator can execute an image editing operation that is simple and easily understood, between or among a plurality of recording media.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An image file editing apparatus, comprising:
   recording medium drive means for performing writing and reading of image files from a recording medium removably installed in the recording medium drive means;
   list display means for obtaining identification information regarding image files stored in said removably installed recording medium read by said recording medium drive means, and displaying a list of image file representations on a display;
   file selection means for selecting image files displayed in the list formed by said list display means;
   editing means for executing a predetermined editing operation on at least one image file selected via said file selection means; and
   medium collating means for searching out said identification information from the removably installed recording medium in said recording medium drive means and determining whether the removably installed recording medium includes image files corresponding to the image file representations already displayed in the list, wherein
   said list display means displays in the list at least one image file representation of an image file stored in the removably installed recording medium after said recording medium collating means determines that the removably installed recording medium includes image files different from the image files corresponding to the image file representations already displayed in the list.

2. An image file editing apparatus according to claim 1, wherein said recording medium collating means comprises:
   identification readout means for reading out one or more types of previously stored information from said removably installed recording medium, and uses said one or more types of information as said identification information, and
   new/old collating means for determining that the removably installed recording medium includes image files that are different from the image files corresponding to the image file representations already displayed in the list when the identification information read out by said identification readout means fails to match previously read out identification information.

3. An image file editing apparatus according to claim 1, wherein said recording medium collating means comprises:
   identification recording means for storing identification information of recording media for which image file representations are displayed in the list by said list display means, and
   search determining means for determining that the removably installed recording medium contains image files that are different from the image files corresponding to the image file representations already displayed in the list when the search determining means fails to find said identification information of the removably installed recording medium in said identification recording means.

4. An image file editing apparatus according to claim 1, wherein the image file representations displayed by said list display means are thumbnail images based on the image files.

5. An image file editing apparatus according to claim 1, wherein the apparatus is an electronic camera, the electronic camera including a photographic lens that forms a light image of an object on a photoelectric converter that converts the light image into image signals that are stored by the recording medium drive means in the removably installed recording medium.

6. An image file processing apparatus, comprising:
   a recording medium drive that reads image files from a recording medium removably installed in the recording medium drive;
   a list display generator coupled to the recording medium drive to obtain identification information regarding image files stored in the removably installed recording medium, and to generate a list of image file representations for display on a display; and
   a controller coupled to the recording medium drive and to the list display generator to determine whether the removably installed recording medium includes image files corresponding to the image file representations already displayed in the list based on the identification information of the removably installed recording medium.

7. An image file processing apparatus according to claim 6, wherein said controller causes the recording medium drive to read out one or more types of stored information from said removably installed recording medium, and the controller uses the one or more types of information as said identification information, said controller determining that the removably installed recording medium includes image files that are different from the image files corresponding to the image file representations already displayed in the list when the read out identification information fails to match previously read out identification information.

8. An image file processing apparatus according to claim 6, wherein said controller includes:
   a memory that stores identification information of recording media for which image file representations are displayed in the list by said list display generator;
   said controller determining that the removably installed recording medium contains image files that are different from the image files corresponding to the image file representations already displayed in the list when the controller fails to find the identification information of the removably installed recording medium in said memory.

9. An image file processing apparatus according to claim 6, wherein the list display generator displays in the list at least one image file representation of an image file stored in the removably installed recording medium after the controller determines that the removably installed recording medium includes image files different from the image files corresponding to the image file representations already displayed in the list.

10. An image file processing apparatus according to claim 6, wherein the image file processing apparatus is an image file editing apparatus that further comprises:
    a file selector coupled to the controller and to the list display generator to select image files displayed in the list according to an externally provided operation; and
    an editor coupled to the controller and to the recording medium drive to execute a predetermined editing operation on at least one image file selected via the file selector.

11. An image file processing apparatus according to claim 6, wherein the image file representations displayed by said list display generator are thumbnail images based on the image files.

12. An image file processing apparatus according to claim 6, wherein the apparatus is an electronic camera, the electronic camera including a photographic lens that forms a light image of an object on a photoelectric converter that converts the light image into image signals that are stored by the recording medium drive in the removably installed recording medium.

13. An image file processing apparatus, comprising:
    a recording medium drive that reads image files from a recording medium removably installed in the recording medium drive;
    a list display generator coupled to the recording medium drive to obtain identification information regarding image files stored in the removably installed recording medium, and to generate a list of image file representations for display on a display; and
    a controller coupled to the recording medium drive and to the list display generator to determine, when the removably installed recording medium is initially installed, whether the removably installed recording medium was previously installed in the recording medium drive, wherein
    the list display generator displays in the list at least one image file representation of an image file stored in the removably installed recording medium after the controller determines that the removably installed recording medium was not previously installed in the recording medium drive.

14. An image file processing apparatus according to claim 13, wherein the image file processing apparatus is an image file editing apparatus that further comprises:
    a file selector coupled to the controller and to the list display generator to select image files displayed in the list according to an externally provided operation; and
    an editor coupled to the controller and to the recording medium drive to execute a predetermined editing operation on at least one image file selected via the file selector.

15. An image file processing apparatus according to claim 13, wherein the image file representations displayed by said list display generator are thumbnail images based on the image files.

16. An image file processing apparatus according to claim 13, wherein the apparatus is an electronic camera, the electronic camera including a photographic lens that forms a light image of an object on a photoelectric converter hat converts the light image into image signals that are stored by the recording medium drive in the removably installed recording medium.

17. A method of processing image files, comprising the steps of:
    reading image files from a recording medium removably installed in a recording medium drive;
    obtaining identification information regarding image files stored in the removably installed recording medium;
    generating a list of image file representations for display on a display; and
    determining whether the removably installed recording medium includes image files corresponding to the image file representations already displayed in the list based on the identification information obtained from the removably installed recording medium.

18. A method according to claim 17, wherein said determining step includes:
    reading out one or more types of stored information from the removably installed recording medium and using the one or more types of information as said identification information; and determining that the removably installed recording medium includes image files that are different from the image files corresponding to the image file representations already displayed in the list when the read out identification information fails to match previously read out identification information.

19. A method according to claim 17, wherein said determining step includes:

determining that the removably installed recording medium contains image files that are different from the image files corresponding to the image file representations already displayed in the list when a search of a memory in which is stored identification information of recording media for which image file representations are displayed in the list fails to find the identification information of the removably installed recording medium in said memory.

20. A method according to claim 17, further comprising the step of:

displaying in the list at least one image file representation of an image file stored in the removably installed recording medium after it is determined that the removably installed recording medium includes image files different from the image files corresponding to the image file representations already displayed in the list.

21. A method according to claim 17, wherein the image file processing method is an image file editing method that further comprises:

selecting image files displayed in the list according to an externally provided operation; and executing a predetermined editing operation on at least one selected image file.

22. A method according to claim 17, wherein the displayed image file representations are thumbnail images based on the image files.

* * * * *